(12) United States Patent
Alidedeoglu et al.

(10) Patent No.: US 9,670,313 B2
(45) Date of Patent: Jun. 6, 2017

(54) HYDROSTABILITY OF POLYESTER COMPOSITION

(71) Applicant: SABIC INNOVATIVE PLASTICS IP B.V., Bergen Op Zoom (NL)

(72) Inventors: Husnu Alp Alidedeoglu, Evansville, IN (US); Tianhua Ding, Newburgh, IN (US); Ganesh Kannan, Evansville, IN (US)

(73) Assignee: SABIC Global Technologies B.V., Pittsfield, MA (US)

( * ) Notice: Subject to any disclaimer, the term of this patent is extended or adjusted under 35 U.S.C. 154(b) by 23 days.

(21) Appl. No.: 13/950,869

(22) Filed: Jul. 25, 2013

(65) Prior Publication Data

US 2014/0031454 A1 Jan. 30, 2014

(51) Int. Cl.

| | | |
|---|---|---|
| *C08F 299/04* | (2006.01) | |
| *C08K 5/09* | (2006.01) | |
| *C08G 63/85* | (2006.01) | |
| *C08G 63/82* | (2006.01) | |
| *C08G 63/183* | (2006.01) | |
| *C08K 3/40* | (2006.01) | |
| *C08K 5/103* | (2006.01) | |
| *C08L 67/06* | (2006.01) | |
| *C08L 69/00* | (2006.01) | |
| *C08L 17/00* | (2006.01) | |

(52) U.S. Cl.
CPC ........... *C08G 63/85* (2013.01); *C08G 63/183* (2013.01); *C08G 63/82* (2013.01); *C08K 3/40* (2013.01); *C08K 5/103* (2013.01); *C08L 67/06* (2013.01); *C08L 69/00* (2013.01); *C08L 17/00* (2013.01); *Y02P 20/582* (2015.11)

(58) Field of Classification Search
CPC .... C08L 69/00; C08L 69/005; C08L 2201/08; C08L 2314/08; C08L 2666/38; C08L 2666/78; C08L 17/00; C08K 5/005; C08K 5/36; C08G 63/82; C08G 63/85; C08G 63/87
USPC ................................. 523/523, 455
See application file for complete search history.

(56) References Cited

U.S. PATENT DOCUMENTS

| | | | |
|---|---|---|---|
| 4,328,059 A | | 5/1982 | Horlbeck et al. |
| 4,564,658 A | * | 1/1986 | Liu ............... 525/177 |
| 4,707,512 A | * | 11/1987 | Maruyama et al. ......... 524/504 |
| 5,001,178 A | * | 3/1991 | Jalbert et al. ............... 524/109 |
| 5,266,601 A | | 11/1993 | Kyber et al. |

(Continued)

FOREIGN PATENT DOCUMENTS

JP 60147430 8/1985

OTHER PUBLICATIONS

International Search Report of PCT/US2014/048117, dated Nov. 12, 2014.

*Primary Examiner* — Jane L Stanley
(74) *Attorney, Agent, or Firm* — Honigman Miller Schwartz & Cohn LLP; Heidi M. Berven (57) ABSTRACT

Disclosed is a process for the manufacture of a polyalkylene terephthalate such as polybutylene terephthalate. In particular, the process comprises employing a titanium-containing catalyst formed by the reaction product of tetraalkyl titanate and a complexing agent comprising a phosphorous, nitrogen or boron atom. The process is used to prepare polyalkylene terephthalates characterized by improved hydrostability, as well as compositions derived therefrom.

9 Claims, 2 Drawing Sheets

(56) References Cited

U.S. PATENT DOCUMENTS

| | | |
|---|---|---|
| 5,451,611 A | 9/1995 | Chilukuri et al. |
| 5,453,479 A | 9/1995 | Borman et al. |
| 6,060,393 A | 5/2000 | Ngo et al. |
| 6,303,738 B1 | 10/2001 | Putzig et al. |
| 6,372,929 B1 | 4/2002 | Ridland et al. |
| 6,472,557 B1 | 10/2002 | Pell, Jr. |
| 6,762,235 B2 * | 7/2004 | Takenaka et al. ............ 524/494 |
| 7,129,301 B2 | 10/2006 | Wu et al. |
| 7,902,263 B2 | 3/2011 | Agarwal et al. |
| 2003/0149223 A1 | 8/2003 | McCloskey et al. |
| 2005/0113534 A1 | 5/2005 | Agarwal et al. |
| 2008/0182963 A1 * | 7/2008 | Kimura ................. C08G 63/85 528/272 |
| 2008/0207868 A1 * | 8/2008 | Kimura ................... B01J 4/002 528/272 |
| 2009/0264611 A1 * | 10/2009 | Hamano ................ C08G 63/85 528/9 |
| 2009/0275698 A1 | 11/2009 | Ravi et al. |
| 2012/0289655 A1 | 11/2012 | Sumita et al. |
| 2013/0018130 A1 | 1/2013 | Alidedeoglu et al. |
| 2013/0018131 A1 | 1/2013 | Alidedeoglu et al. |
| 2013/0018142 A1 | 1/2013 | Alidedeoglu et al. |
| 2013/0018143 A1 | 1/2013 | Alidedeoglu et al. |
| 2013/0053461 A1 | 2/2013 | Alidedeoglu et al. |

* cited by examiner

HYDROSTABILITY OF POLYESTER COMPOSITION

TECHNICAL FIELD OF THE INVENTION

Disclosed is a process for the manufacture of a polyalkylene terephthalate such as polybutylene terephthalate. In particular, the process comprises employing a titanium-containing catalyst formed by the reaction product of tetraalkyl titanate and a complexing agent comprising a phosphorous, nitrogen or boron atom. The process is used to prepare polyalkylene terephthalates characterized by improved hydrostability, as well as compositions derived therefrom.

BACKGROUND OF THE INVENTION

Polybutylene terephthalate (PBT) resin is a well-known polyalkylene terephthalate that is semi-crystalline and has several desirable properties alone or in blends. Compared to amorphous resins such as acrylonitrile butadiene styrene (ABS), polycarbonate, and polystyrene, a semi-crystalline resin like PBT can show higher solvent resistance, strength, and stiffness due to the presence of crystalline spherulites in the resin. PBT resin is used in many applications in which its solvent resistance, strength, rigidity, and lubricity are needed, most commonly in durable goods that are formed by injection molding. Through its many blended products, PBT can be tailored to a wide variety of applications, including electronic and communications equipment, computers, televisions, kitchen and household appliances, industrial equipment, lighting systems, gardening and agricultural equipment, pumps, medical devices, food handling systems, handles, power and hand tools, bobbins and spindles, and automotive parts in both under-the-hood and exterior applications. Additionally, PBT is widely used to form electrical connectors.

It is generally known that PBT can be made by reacting 1,4-butanediol (BDO) with terephthalic acid (TPA) or dimethyl terephthalate (DMT) in the presence of a transesterification catalyst. U.S. Pat. Nos. 7,129,301; 6,020,393; 4,328,059, and US Patent Pub. 2005/0113534 A1 disclose various catalysts for the polymerization of polyesters.

Commonly used catalysts for the polymerization of PBT include tetraalkyl titanates. Among the various titanates are tetraisopropyl titanate, tetrabutyl titanate, and tetra(2-ethylhexyl) titanate. For example, JP 60147430 discloses a method of producing polyester by esterifying terephthalic acid, adipic acid and 1,4-butanediol in the presence of a titanium compound and a pentavalent phosphorus compound. U.S. Pat. No. 6,303,738 discloses a process for producing copolyester containing adipic acid in the presence of TYZOR® IAM (available from DuPont), which is prepared through the combination of tetraisopropyl titanate (TPT) and a mixture of butyl phosphate and dibutyl phosphate.

The catalyst used to prepare PBT is not typically quenched (deactivated) at the end of the polymerization process. Unfortunately, an active catalyst in the resin composition can sometimes lead to undesirable reactions in subsequent processing of the polyalkylene terephthalate. On exposure to high temperature and humidity, blends and compositions containing the polyalkylene terephthalate can exhibit hydrolytic degradation. Another problem associated with the presence of the active catalyst is transesterification, which can lead to loss of mechanical properties.

Catalyst quenchers such as phosphoric acid can be added to thermoplastic compositions to prevent such transesterification, but they can also promote degradation of polymer chains and contribute to a decrease in polymer molecular weight as well as greater hydrolytic instability. The use of phosphite stabilizers is less satisfactory because of the tendency for phosphites to be unstable to both hydrolysis and oxidation.

Insufficient hydrostability of polyalkylene terephthalate can lead to chain cleavage, the extent of which depends on the exact conditions of exposure to water or humidity. Temperature, time of exposure, and pH are all important. Both acids and bases can catalyze ester hydrolysis. Decomposition of polyalkylene terephthalate can be accelerated in aqueous acid or base, or if the polymer matrix of polyalkylene terephthalate contains free acid or base additives. Since one of the reaction products of polyester hydrolysis is itself a carboxylic acid, the hydrolytic decomposition of PBT is autocatalytic, as depicted in Scheme 1.

Scheme 1

Thus, a need remains for new and improved catalysts or processes for the production of polyalkylene terephthalates that are effective in polymerization, but which do not adversely impact the properties of the resulting polyalkylene terephthalate. There is also a need eliminate the necessity of using either quencher or chain extender additives in preparing polyalkylene terephthalates. There is a further need for polyalkylene terephthalates with improved properties including hydrostability as well as polymer compositions derived therefrom.

SUMMARY OF THE INVENTION

These and other needs are met by the present invention which is directed to polyalkylene terephthalates that are prepared by employing a polyesterification catalyst that comprises a complex that is the reaction product of a tetra($C_1$-$C_8$ alkyl) titanate and a compound selected from phosphorus-containing compounds, nitrogen-containing compounds, and boron-containing compounds. The catalyst is synthesized in-situ, prior to ester interchange, for use during the ester interchange and polymerization stages of the manufacturing process. Surprisingly, although the catalyst is not separated from the polyalkylene terephthalates prior to isolation or further processing, it does not deleteriously affect the hydrostability or mechanical performance of the material.

The process of preparing a polyalkylene terephthalate comprises reacting an alkylene diol and a dicarboxy aromatic compound selected from the group consisting of aromatic dicarboxylic acids, aromatic dicarboxylic ($C_1$-$C_3$) alkyl esters, and combinations thereof, wherein the process comprises forming a catalyst which consists of the reaction product of a tetra($C_1$-$C_8$ alkyl) titanate such as tetraisopropyl titanate and a complexing agent. The complexing agent is selected from the group consisting of phosphorus-containing compounds, nitrogen-containing compounds, boron-containing compounds, and combinations thereof; obtaining ester interchange by combining the catalyst with the alkylene diol and the aromatic dicarboxy compound; and polymerizing the product of ester interchange, in the continued presence of the catalyst. The catalyst can be formed in-situ prior to the ester interchange stage, specifically formed in a solution comprising the alkylene diol, shortly before the ester interchange takes place; i.e., before the alkylene diol and diacid are combined, specifically within 48 hours, more specifically within 24 hours, for example, within a time space of 12 hours or less.

This process solves the problem in the prior art regarding undesirable post-polymerization catalytic activity. In particular, as indicated above, the in-situ titanium-based catalyst system can improve hydrolytic stability, reduce or eliminate undesirable transesterification reactions during later processing, and thus improve mechanical performance. Furthermore, the catalyst system allows for the exclusion of catalyst quenchers in thermoplastic compositions containing the polyalkylene terephthalate resin. For example it is not necessary to add a catalyst quencher during compounding or compounding of additives prior to or during extrusion. As a result, because of the reduced amount or absence of catalyst quencher during blending or compounding of the polyalkylene terephthalate with other components, the resulting thermoplastic composition and articles made therefrom can show improved properties such as increased hydrolytic stability.

In one aspect, the invention is directed to a polyalkylene terephthalate with improved hydrostability, wherein the polyalkylene terephthalate contains 50 to 300 ppm of tetra ($C_1$-$C_8$ alkyl) titanate and 100 to 600 ppm of a phosphorous containing compound, both based on the total amount of titanium present, wherein the phosphorous containing compound is selected from the group consisting of phosphoric acid, poly(phosphoric acid), phosphorus acid, monobutyl phosphate, dibutyl phosphate, monoalkyl phosphates, dialkyl phosphates, and combinations thereof. The tetra($C_1$-$C_8$ alkyl) titanate and phosphorous containing compound are both present during the process for making the polyalkylene terephthalate, from prior to the ester interchange stage as described previously, and are not removed prior to isolation or further processing. Improved hydrostability is not observed in polyalkylene terephthalate when the phosphorous containing compound is not resident with the tetra($C_1$-$C_8$ alkyl) titanate prior to ester interchange. That is, subsequent addition of the phosphorous-containing compound does not provide favorable results.

In this aspect and the other aspects and embodiments of the invention, the polyalkylene terephthalate is prepared from "virgin" starting materials and not from recycled polyester such as polyethylene terephthalate. The virgin starting materials include alkylene diols and dicarboxy aromatic compounds selected from the group consisting of aromatic dicarboxylic acids, aromatic dicarboxylic ($C_1$-$C_3$) alkyl esters, and combinations thereof.

Thus, the polyalkylene terephthalate that is used in the present invention is not a "modified polyalkylene terephthalate." Modified polyalkylene terephthalate, which includes "modified PBT," is made from recycled or scrap polyethylene terephthalate (PET) wherein the polymer is modified by containing at least one residue derived from the polyethylene terephthalate component used in the process. The residue can be either incorporated into the structure of the polymer or present in admixture with the resin composition. Thus, modified polyalkylene terephthalates can identifiably differ slightly from PBT that is not made from scrap PET ("virgin PBT") by such modifications which, however, can be controlled so that the modified PBT has desirable properties comparable or similar to virgin PBT with little or no adverse effects.

Modified polyalkylene terephthalate can generally be made by reacting alkylene diol such as 1,4-butanediol with PET particulates, for example flakes, in the presence of a transesterification catalyst, for instance, as disclosed in U.S. Pat. No. 7,902,263. In general, processes for preparing polyesters by depolymerizing aromatic polyesters in the presence of polyols are known in the art. For example, U.S. Pat. No. 5,451,611 describes a process for converting waste polyethylene terephthalate (PET) to either poly(ethylene-co-butylene terephthalate) or polybutylene terephthalate by reaction with butanediol. Example 11 of U.S. Pat. No. 5,451,611 shows a PBT polymer being formed with a complete replacement of ethylene glycol by butanediol. U.S. Pat. No. 5,266,601 and published U.S. Pat Application 20090275698 (A1) describe a process for making PBT from PET by reacting PET with butanediol.

In another aspect, the invention is directed to a hydrostable thermoplastic composition, comprising:

from 50 to 99.99 percent by weight of a polyalkylene terephthalate, wherein the polyalkylene terephthalate contains 50 to 300 ppm of tetra($C_1$-$C_8$ alkyl) titanate and 100 to 600 ppm of a phosphorous containing compound, both based on the total amount of titanium present, wherein the phosphorous containing compound is selected from the group consisting of phosphoric acid, poly(phosphoric acid), phosphorus acid, monobutyl phosphate, dibutyl phosphate, monoalkyl phosphates, dialkyl phosphates, and combinations thereof;

from 0 to 60 percent by weight of a reinforcing filler;

from 0.05 to 5 percent by weight of a chain extender; and wherein no quencher for the catalyst complex is added to the compounded thermoplastic composition;

wherein the polyalkylene terephthalate is not produced from recycled PET; and wherein all weight percents are based on the total weight of the composition.

In another aspect, the invention is directed to a hydrostable thermoplastic composition, comprising:

from 50 to 99.99 percent by weight of a polyalkylene terephthalate, wherein the polyalkylene terephthalate contains 50 to 300 ppm of tetra($C_1$-$C_8$ alkyl) titanate and 100 to 600 ppm of a phosphorous containing compound, both based on the total amount of titanium present, wherein the phosphorous containing compound is selected from the group consisting of phosphoric acid, poly(phosphoric acid), phosphorus acid, monobutyl phosphate, dibutyl phosphate, monoalkyl phosphates, dialkyl phosphates, and combinations thereof;

from 0 to 60 percent by weight of a reinforcing filler;

from 0.05 to 5 percent by weight of a chain extender;

from 0 to 30 percent by weight of an impact modifier or other polymer; and from 0 to 5 percent by weight of an additive selected from a nucleating agent, antioxidant, UV stabilizer, plasticizer, epoxy compound, melt strength additive, flame retardant, or a combination thereof, crosslinkers, and combinations thereof; and wherein no quencher for the catalyst complex is added to the compounded thermoplastic composition;

wherein the polyalkylene terephthalate is not produced from recycled PET; and wherein all weight percents are based on the total weight of the composition.

In a further embodiment, the invention is directed to a process of preparing a hydrostable thermoplastic composition as provided above by blending, based on the total weight of the thermoplastic composition:

from 50 to 99.99 percent by weight of a polyalkylene terephthalate, wherein the polyalkylene terephthalate contains 50 to 300 ppm of tetra($C_1$-$C_8$ alkyl) titanate and 100 to 600 ppm of a phosphorous containing compound, both based on the total amount of titanium present, wherein the phosphorous containing compound is selected from the group consisting of phosphoric acid, poly(phosphoric acid), phosphorus acid, monobutyl phosphate, dibutyl phosphate, monoalkyl phosphates, dialkyl phosphates, and combinations thereof;

from 0 to 60 percent by weight of a reinforcing filler;
from 0.05 to 5 percent by weight of a chain extender;
from 0 to 30 percent by weight of an impact modifier or other polymer; and
from 0.01 to 5 percent by weight of a an additive selected from a nucleating agent, antioxidant, UV stabilizer, plasticizer, epoxy compound, melt strength additive, or a combination thereof, crosslinkers, and combinations thereof; and
wherein no quencher for the catalyst complex is added to the compounded thermoplastic composition;
wherein the polyalkylene terephthalate is not produced from recycled PET; and
wherein all weight percents are based on the total weight of the composition.

These and other features, aspects, and advantages will become better understood with reference to the following description and appended claims.

DETAILED DESCRIPTION OF THE INVENTION

As used herein the singular forms "a," "an," and "the" include plural referents. The term "combination" is inclusive of blends, mixtures, alloys, reaction products, and the like. Unless defined otherwise, technical and scientific terms used herein have the same meaning as is commonly understood by one of skill. Compounds are described using standard nomenclature. The term "and a combination thereof" is inclusive of the named component and/or other components not specifically named that have essentially the same function.

Other than in the operating examples or where otherwise indicated, all numbers or expressions referring to quantities of ingredients, reaction conditions, and the like, used in the specification and claims are to be understood as modified in all instances by the term "about." Various numerical ranges are disclosed in this patent application. Because these ranges are continuous, they include every value between the minimum and maximum values. The endpoints of all ranges reciting the same characteristic or component are independently combinable and inclusive of the recited endpoint. Unless expressly indicated otherwise, the various numerical ranges specified in this application are approximations. The term "from more than 0 to" an amount means that the named component is present in some amount more than 0, and up to and including the higher named amount.

All ASTM tests and data are from the 2003 edition of the Annual Book of ASTM Standards unless otherwise indicated.

With respect to the terms "terephthalic acid group" and "isophthalic acid group" ("diacid groups") or "ethylene glycol group," "butanediol group," and "diethylene glycol group" ("diol groups) being used to indicate, for example, the weight percent (percent by weight) of the group in a molecule, the term "isophthalic acid group(s)" means the group or residue of isophthalic acid having the formula (—O(CO)$C_6H_4$(CO)—), the term "terephthalic acid group" means the group or residue of isophthalic acid having the formula (—O(CO)$C_6H_4$(CO)—), the term "diethylene glycol group" means the group or residue of diethylene glycol having the formula (—O($C_2H_4$)O($C_2H_4$)—), the term "butanediol group" means the group or residue of butanediol having the formula (—O($C_4H_8$)—), and the term "ethylene glycol group" means the group or residue of ethylene glycol having the formula (—O($C_2H_4$)—).

The term "recycle" as used herein refers to any component that has been manufactured and either used or intended for scrap. Thus, a recycle polyester can be polyester that has been used, for example in drinking bottle, or that is a byproduct of a manufacturing process, for example that does not meet a required specification and therefore would otherwise be discarded or scrapped. Recycle materials can therefore contain virgin materials that have not been utilized.

The prefix "bio-" or "bio-derived" as used herein means that the compound or composition is ultimately derived from a biomass or biological source, e.g., "bio-1,3-propane diol" is derived from a biological (e.g., plant or microbial source) rather than a petroleum source. Similarly, the prefix "petroleum-" or "petroleum-derived" means that the compound or composition is ultimately derived from a petroleum source, e.g., a "petroleum-derived polyethylene terephthalate is derived from reactants that are themselves derived from petroleum.

The term "biomass" means living or dead biological matter that can be directly or subsequently converted to useful chemical substances that are ordinarily derived from non-renewable hydrocarbon sources. Biomass can include cellulosic materials, grains, starches derived from grains, fatty acids, plant based oils, as well as derivatives from these biomass examples. Examples of useful chemical substances include and are not limited to diols and monomers used to make diols. Biomass based butane diol can be obtained from several sources. For instance, the following process can be used to obtain biomass-based 1,4-butane diol. Agriculture based biomass, such as corn, can be converted into succinic acid by a fermentation process that also consumes carbon dioxide. Such succinic acid is commercially available from several sources such as from Diversified Natural Products Inc. under the trade name "BioAmber™". This succinic acid can be easily converted into 1,4-butane diol by processes described in several published documents such as in U.S. Pat. No. 4,096,156, incorporated herein in its entirety. Another process that describes converting succinic acid into 1,4-butane diol is described in Life Cycles Engineering Guidelines, by Smith et al., as described in EPA publication EPA/600/R-1/101 (2001).

The term "contain" as it refers to a polyalkylene terephthalate containing the catalyst described herein, means that the catalyst, which can be synthesized in-situ, is present during formation of the terephthalate, so that the catalyst is present in the isolated polyalkylene terephthalate product.

In this application, parts per million (ppm) as relating, for instance, to ppm of tetra($C_1$-$C_8$ alkyl) titanate and ppm of a phosphorous containing compound in the polyalkylene terephthalate or compositions derived therefrom, is based on the total amount of titanium contained in the polyalkylene terephthalate.

In this application, the phrase "wherein essentially no quencher for the catalyst complex is added to the compounded thermoplastic composition" means that no quencher is added to the thermoplastic composition.

In the aspects and embodiments of the invention described herein, polyalkylene terephthalate is prepared from "virgin" starting material and not from recycled PET.

Unless otherwise specified, amounts are indicated in percents by weight.

Process

The invention described herein is based on the discovery that it is possible to produce polyalkylene terephthalate with improved hydrostability using a novel titanium-containing catalyst complex comprising the reaction product of a tetra ($C_1$-$C_8$ alkyl) titanate with a complexing agent selected from the group consisting of phosphorus-containing compounds, nitrogen-containing compounds, boron-containing compounds, and combinations thereof.

The process used to prepare polyalkylene terephthalate containing aromatic dicarboxylic acid groups incorporated into the polyester involves the reaction of a dicarboxy aromatic compound, for example an aromatic dicarboxylic acid, with an alkylene diol under conditions sufficient to form the polyester. Examples of the aromatic dicarboxylic acid group include isophthalic acid groups, terephthalic acid groups, and a combination thereof. The aromatic dicarboxylic group in the polyester can also be derived from corresponding di($C_1$ to $C_3$) alkyl esters. In a preferred embodiment, the aromatic dicarboxylic acid group is derived from terephthalic acid or di($C_1$-$C_3$)alkyl ester thereof.

The titanium catalyst comprises the reaction product of a tetra($C_1$-$C_8$ alkyl) titanate such as tetraisopropyl titanate and a complexing agent selected from:

(1) phosphorus-containing compounds, at a molar ratio of the phosphorus-containing compound:titanate from 0.05:1 to less than or equal to 1.2:1, specifically 0.2:1 to 1.2:1, more specifically 0.3:1 to 1.2:1, most specifically 0.5:1 to 1.2:1, (2) nitrogen-containing compounds, at a molar ratio of the nitrogen-containing compound:titanate from 0.05:1 to less than or equal to 1.2:1, specifically 0.2:1 to 1.2:1, more specifically 0.3:1 to 1.2:1, most specifically 0.5:1 to 1.2:1, (3) boron-containing compounds, at a molar ratio of the boron-containing compound:titanate from 0.05:1 to less than or equal to 1.2:1, specifically 0.2:1 to 1.2:1, more specifically 0.3:1 to 1.2:1, most specifically 0.5:1 to 1.2:1, and (4) combinations thereof.

Phosphorus-containing compounds can include, for example, phosphoric acid, poly(phosphoric acid), phosphorous acid, monobutyl phosphate, dibutyl phosphate, monoalkyl phosphates, dialkyl phosphates, and combinations thereof. Specifically, the phosphorous-containing compound can be a compound in which the phosphorus atom is bound to four oxygen atoms, more specifically a compound that is not a metallic salt. Thus, the catalyst can be the reaction product of a tetraalkyl titanate and a phosphorous-containing compound in which less than 50 mol %, specifically less than 25 mol %, more specifically essentially zero mol %, of the phosphorous-containing compound is associated with a metallic ion, specifically Li, Na, K, Ca, Mg, Ba, Zn, or mixtures thereof. More specifically, the phosphorous-containing compound comprises only one phosphorous atom per molecule. Thus, the formation of chelating ligands can be excluded in preparing the catalyst. In one embodiment, phosphonate and phosphonic acid compounds are excluded.

In particular, the present process comprises forming a catalyst in-situ by combining a tetra($C_1$-$C_8$ alkyl) titanate such as tetraisopropyl titanate with a complexing agent such as phosphoric acid and an alkylene diol, prior to transesterification and polymerization. By "in-situ" is meant that the catalyst, a titanium complex, is not premade but is formed during the process in the presence of one or more components of the process. Thus, the catalyst is present during the transesterification and polymerization reactions.

In preparing the catalyst, the tetra($C_1$-$C_8$ alkyl) titanate, for reaction with the complexing agent, can be provided in a total amount of 25 to 1000 ppm, based on the total weight of the composition. The catalyst can be present in the process, during depolymerization and polymerization, in the amount of 10 to 1000 ppm, specifically 25 to 500 ppm, more specifically 35 to 250 ppm, most specifically 45 to 200 ppm, of titanium (Ti) based on the total weight of the composition (as well as based on the resulting solid product).

Nitrogen-containing compounds for forming the catalyst complex can include alkyl amines, aromatic amines, alkyl aromatic amines, alkanol amines, ammonium compounds, and combinations thereof.

Boron-containing compounds can include boric acid, boron alkoxides, boric oxides, boron halides, metaborates, monoalkyl borates, dialkyl borates, trialkyl borates, borazines, and combinations thereof.

In reference to the nitrogen-containing, phosphorous-containing, and boron-containing compounds, the term "alkyl" refers to branched or straight chain monovalent saturated groups comprising carbon and hydrogen, specifically having 1 to 12, more specifically 1 to 6, most specifically 1-3 carbon atoms. Specifically, alkanol can have an analogous number of carbon atoms. Aromatic compounds have at least one, specifically one, two or three $C_6$-$C_{12}$ aryl groups (for example phenyl, naphthyl, or the like) containing only carbon in the aromatic ring, optionally substituted. Exemplary substituents can include halogen, cyano, nitro, hydroxyl, alkyl, alkoxy, arylalkoxy, and combinations thereof.

In general, preparation of a polyalkylene terephthalate, specifically PBT, by melt-process polycondensation is well known to those skilled in the art. Conventional polycondensation procedures are described, for example, in U.S. Pat. No. 2,012,267. Such reactions are typically operated at temperatures from 150° C. to 300° C. in the presence of a catalyst employed in amounts between 10 to 1000 parts per million (ppm), based on total weight of the reactants. A branched polyalkylene terephthalate can be prepared in which a branching agent, for example, a glycol having three or more hydroxyl groups or a trifunctional or multifunctional carboxylic acid has been incorporated.

For example, conventional processes are known by which a poly(1,4-butylene terephthalate) or "PBT" resin can be obtained by polymerizing a glycol component at least 90 mol %, specifically at least 95 mol %, of which consists of tetramethylene glycol and an acid or ester component at least 90 mol %, specifically at least 95 mol %, of which consists of terephthalic acid. The present process can be used in cooperation with, or adapted to, methods (or elements of methods) available in the prior art, as will be appreciated by one of ordinary skill in the art.

As stated above, the present process of preparing a polyalkylene terephthalate can be by melt polycondensation comprising reacting an alkylene diol and a dicarboxy compound selected from the group consisting of an aromatic dicarboxylic acid, an aromatic dicarboxylic ($C_1$-$C_3$)alkyl ester, and combinations thereof, wherein ester interchange and polymerization occurs in the presence of a catalyst formed by reaction of a tetra($C_1$-$C_8$ alkyl) such as titanate tetraisopropyl titanate and a compound selected from phosphorus-containing compounds, nitrogen-containing compounds, boron-containing compounds, and combinations thereof, wherein the catalyst is synthesized in-situ.

In particular, the present process comprises forming the catalyst in-situ by combining the tetra($C_1$-$C_8$ alkyl) titanate, complexing agent, and alkylene diol (prior to introduction of the aromatic dicarboxy compound) to form a first mixture, wherein the first mixture is subjected to heat at an elevated first temperature.

The aromatic dicarboxy compound can then be subsequently introduced, optionally with additional alkylene diol, into the first mixture to form a second mixture, which can be subjected to heat to obtain ester interchange at an elevated second temperature, specifically at a temperature that is higher than the first temperature. In one embodiment, the ester interchange is carried out until the production of methanol volatiles substantially ceases.

Polymerization can be initiated and carried out under vacuum, after substantial completion of the ester interchange, by further increasing the temperature to a third temperature higher than the second temperature. In particular, the second mixture can be subjected to vacuum, optionally with distillation, at a pressure of less than 2 Torr and a temperature of 220° C. to 270° C., to form molten polyalkylene terephthalate.

By way of illustration, a titanium-containing catalyst comprising the reaction product of tetra($C_1$-$C_8$ alkyl) titanate such as tetraisopropyl titanate and a phosphorous-containing compound, for example, phosphoric acid, can be formed in-situ as shown in Scheme 1.

phoric acid and TPT. Without wishing to be bound by theory, it is believed that once all strongly acidic hydroxyl groups are consumed, the ester interchange and polymerization (polyesterification or polycondensation) can be conducted without inhibition. After the catalyst preparation, all the monomer components can be introduced into the reactor, and the reaction temperature can be increased, for example to 220° C., to complete the ester interchange, followed by polycondensation, for example at 250° C.

The alkylene diol groups incorporated into the polyalkylene terephthalate according to the present process can be derived from any alkylene diol, including cyclic and non-cyclic alkylene diols, that can react with the aromatic dicarboxy compound to form the polyalkylene terephthalate. Examples of suitable alkylene diols can include ethylene glycol, 1,2-propylene glycol, 1,3-propylene glycol, 1,2-butanediol, 2,3-butanediol, 1,4-butanediol, tetramethyl cyclobutanediol, cyclohexane dimethanol (including 1,2-, 1,3-, and 1,4-cyclohexane dimethanol), hexylene glycols, and combinations thereof. In one embodiment, the alkylene diol is selected from 1,4-butanediol, 1,3-propanediol, ethylene glycol, and combinations thereof. Any of the foregoing alkylene diols can be bio-derived from a biological source, for example, biomass.

The aromatic dicarboxy compound used in the present process can include dimethyl terephthalate derived from recycled PET. Processes for recovering dimethyl terephthalate, also referred to as DMT or the dimethyl ester of terephthalic acid, are known in the art, for example as set forth in U.S. Pat. No. 6,472,557 and other patents disclosed therein, which disclosure is incorporated herein by reference. Typically, the polyethylene terephthalate is reacted at elevated temperature and suitable conditions with an alcohol, such as methanol, to break the ester linkages of the Scheme 1

The in-situ reaction between phosphoric acid (PA) and titanium isopropoxide (TPT) in diol solvent (for example, butanediol) can achieve a complete conversion in the reaction between the most acidic hydroxyl group of the phospolyester and yield the corresponding diesters of the terephthalic acid, such as dimethyl terephthalate (DMT).

The present process excludes or limits the presence of aliphatic dicarboxylic acid monomers to form the polyalkylene terephthalate, which monomers comprise less than 5 percent by weight of the polyalkylene terephthalate, specifically less than 2 percent by weight, more specifically essentially zero percent by weight. Thus, aliphatic dicarboxylic compounds having the general formula $(CH_2)_m(COOH)_2$, where m is an integer from 2 to 12, are excluded from use in preparing the polyalkylene terephthalate. Specifically, aliphatic dicarboxylic acids such as decanedioic acid, adipic acid, and sebacic acid are excluded or limited to insignificant amounts in the present process.

Examples of polyalkylene terephthalate that can be prepared by the present process include, for example, polyethylene terephthalate ("PET"), poly(1,4-butylene terephthalate) ("PBT"), polypropylene terephthalate ("PPT"), polycyclohexane terephthalate, copolyesters of terephthalate esters with comonomers containing cyclohexyl dimethanol and ethylene glycol, copolyesters of terephthalate acid with comonomers containing cyclohexyl dimethanol and ethylene glycol, polytrimethylene terephthalate, polydianol terephthalates, and combinations thereof.

The process can also be employed to prepare a polyalkylene terephthalate that is a copolyester derived from terephthalic acid (specifically terephthalic acid and/or isophthalic acid) and a mixture comprising a linear $C_{2-6}$ aliphatic diol (specifically ethylene glycol and butylene glycol); and a $C_{6-12}$ cycloaliphatic diol (specifically 1,4-cyclohexane diol, dimethanol decalin, dimethanol bicyclooctane, 1,4-cyclohexane dimethanol and its cis- and trans-isomers, 1,10-decane diol, and the like). The ester units comprising the two or more types of diols can be present in the polymer chain as individual units or as blocks of the same type of units. Specific esters of this type include poly(1,4-cyclohexylene dimethylene co-ethylene terephthalate) (PCTG) wherein greater than 50 mol % of the ester groups are derived from 1,4-cyclohexanedimethanol; and poly(ethylene-co-1,4-cyclohexylenedimethylene terephthalate) wherein greater than 50 mol % of the ester groups are derived from ethylene (PTCG). Thus, the term "alkylene diol" as used herein is meant to include both aliphatic and cycloaliphatic alcohols.

The process of preparing a polyalkylene terephthalate can comprise relatively lesser amounts of isophthalate groups and specifically less than 10 percent by weight, more specifically less than 5 percent by weight, most specifically less than 2 percent by weight of acid groups other than terephthalate groups, isophthalate groups, and alkylene diol groups (cyclic alkylene diol groups and non-cyclic alkylene diol groups).

In one embodiment, the present process is used to prepare a polyalkylene terephthalate wherein the polyalkylene terephthalate contains 50 to 300 ppm of tetra($C_1$-$C_8$ alkyl) titanate and 100 to 600 ppm of a phosphorous containing compound, both based on the total amount of titanium present, wherein the phosphorous containing compound is selected from the group consisting of phosphoric acid, poly(phosphoric acid), phosphorus acid, monobutyl phosphate, dibutyl phosphate, monoalkyl phosphates, dialkyl phosphates, and combinations thereof. The polyalkylene terephthalate typically has a number average molecular weight of at least 15,000 g/mol, specifically 20,000 to 200,000 g/mol and a polydispersity index from 2 to less than 6, specifically 2 to 5. In such an embodiment, the polyalkylene terephthalate, specifically PBT, has a melting temperature ($T_m$) ranging from 150° C. to 223° C., specifically 200° C. to 218° C., more specifically 204° C. to 210° C. The molecular weight can be obtained using polystyrene standards, as measured by gel permeation chromatography in chloroform/hexafluoroisopropanol (5:95, volume/volume ratio) at 25° C.

In one embodiment, the polyalkylene terephthalate is polybutylene terephthalate which contains 50 to 300 ppm of tetra($C_1$-$C_8$ alkyl) titanate which is tetraisopropyl titanate and 100 to 600 ppm of a phosphorous containing compound which is phosphoric acid. The PBT typically has an intrinsic viscosity (as measured in phenol/tetrachloroethane (60:40, volume/volume ratio) at 25° C.) of 0.4 to 2.0 deciliters per gram. In one embodiment, the PBT resin has an intrinsic viscosity of 0.6 to 1.4 dl/g.

In another aspect, the invention is directed to a polyalkylene terephthalate prepared by a process comprising reacting a alkylene diol and a dicarboxy aromatic compound selected from the group consisting of aromatic dicarboxylic acids, aromatic dicarboxylic ($C_1$-$C_3$)alkyl esters, and combinations thereof, wherein the process comprises:

forming a catalyst that consists of the reaction product of tetra($C_1$-$C_8$ alkyl) titanate and a complexing agent selected from the group consisting of phosphorus-containing compounds, a nitrogen-containing compounds, a boron-containing compound, and combinations thereof;

obtaining ester interchange by combining the catalyst with the alkylene diol and the aromatic dicarboxy compound; and polymerizing the product of ester interchange, in the continued presence of the catalyst, yielding polyalkylene terephthalate.

Compositions

The polyalkylene terephthalate resin prepared by the process described above can be blended with other components to obtain a thermoplastic composition. Additives can be added to the polyalkylene terephthalate resin for the purpose of imparting properties desirable in the product being made. Additives are ordinarily incorporated into polymer compositions with the proviso that the additives are selected so as to not significantly adversely affect the desired properties of the composition, for example, impact, flexural strength, color, and the like. Such additives can be mixed at a suitable time during the mixing of the components for forming the composition. Possible additives include impact modifiers, fillers, reinforcing agents, anti-oxidants, heat stabilizers, light stabilizers, ultraviolet light (UV) absorbers, plasticizers, lubricants, mold release agents, antistatic agents, colorants, blowing agents, melt strength additives, flame retardants, and anti-drip agents. A good source for information relating to additives is the *Plastics Additives Handbook*, 6*th* ed. (Hans Zweifel, Ed., 2009).

Combinations of additives can be used, for example, an antioxidant, a UV absorber, and a mold release agent. The total amount of additives (other than any impact modifier, filler, or reinforcing agents) is generally 0.01 to 15 percent by weight, based on the total weight of the composition.

The thermoplastic composition prepared as described herein is characterized by the intentional exclusion of a catalyst quencher such as an acid interchange quencher from the composition. Thus, a process according to the present invention can be further characterized by excluding (not adding) a catalyst quencher as a means for quenching the catalyst in the thermoplastic composition containing the polyalkylene terephthalate resin composition.

As indicated previously, quenchers are agents that inhibit activity of any catalysts that can be present in the thermoplastic composition, in order to prevent an accelerated interpolymerization and degradation of the polymer in the thermoplastic composition. Such quenchers are selected from the group consisting of acidic phosphate salts, acid phosphites, alkyl phosphites, aryl phosphites, mixed phosphites and combinations thereof, specifically acidic phosphate salts; acid phosphites, alkyl phosphites, aryl phosphites or mixed phosphites having at least one acidic hydrogen; a Group IB or Group IIB metal phosphate salt; a phosphorus oxo acid, a metal acid pyrophosphate or a mixture thereof. The acidic phosphate salts can include sodium dihydrogen phosphate, mono zinc phosphate, potassium hydrogen phosphate, calcium dihydrogen phosphate and the like. Specific quenchers are phosphoric acid, phosphorous acid or their partial esters such as mono zinc phosphate. More specifically, quenchers can include zinc phosphate, monozinc phosphate, phosphorous acid, phosphoric acid diluted in water, sodium acid pyrophosphate, tetrapropylorthosilicate, tetrakis-(2-methoxyethoxy)silane), sodium lauryl sulphate, boric acid, citric acid, oxalic acid, a cyclic iminoether containing compound, and combinations thereof.

The thermoplastic composition prepared from the polyalkylene terephthalate can also comprise at least one reinforcing filler. For example reinforcing filler can comprise rigid fibers such as glass fibers, carbon fibers, metal fibers, ceramic fibers or whiskers such as wollastonite, polymeric fibers such as tetrafluoroethylene or aramid fibers, and the like. Glass fibers typically have a modulus of greater than or equal to about 6,800 megaPascals, and can be chopped or continuous. The glass fiber can have various cross-sections, for example, round, trapezoidal, rectangular, square, crescent, bilobal, trilobal, and hexagonal. In one embodiment, glass is preferred, especially glass that is relatively soda free. Fibrous glass filaments comprised of lime-alumino-borosilicate glass, which is also known as "E" glass are often especially preferred. Glass fiber is added to the composition to greatly increase the flexural modulus and strength, albeit making the product more brittle. The glass filaments can be made by standard processes, e.g., by steam or air blowing, flame blowing and mechanical pulling. The preferred filaments for plastic reinforcement are made by mechanical pulling. For achieving optimal mechanical properties fiber diameter between 6-20 microns can be used with a diameter of from 10-15 microns being preferred. In preparing the molding compositions it is convenient to use the fiber in the form of chopped strands of from about ⅛" (3 mm) to about ½" (13 mm) long although roving can also be used. In articles molded from the compositions, the fiber length is typically shorter presumably due to fiber fragmentation during compounding of the composition. The length of such short glass fibers present in final molded compositions is less than about 4 mm. The fibers can be treated with a variety of coupling agents to improve adhesion to the resin matrix. Preferred coupling agents include; amino, epoxy, amide or mercapto functionalized silanes. Organometallic coupling agents, for example, titanium or zirconium based organometallic compounds, can also be used. Other preferred sizing-coated glass fibers are commercially available from Owens Corning Fiberglass as, for example, OCF K filament glass fiber 183F.

In another embodiment, long glass fibers can be used, wherein a continuous glass fiber bundle containing thousands of glass fiber monofilaments having a diameter in the range, 6-24 μm, specifically 8-18 μm is impregnated with melted PBT polyester. After cooling, the impregnated bundle is cut into pellets having a length of >5 mm, specifically, above >9 mm, as prepared by the application of a process known as the pullout or pultrusion process. For impregnation, a high flow PCT polyester of the present invention can be used in order to improve the wetting rate of the filaments to make long glass fiber pellets. These pellets can be incorporated into the polyester compositions of the invention, to get long fiber glass-reinforced polyester compositions. The length of long glass fiber present in molded composition prepared by this method is typically greater than that prepared by incorporation of short fibers and predominant portion of the long glass fibers present have a length >4 mm in the molded part. Such long fiber glass reinforced compositions can be used for different molding techniques such as injection molding, compression molding, thermoforming and the like. As in the case of short fibers, the long fibers can also be treated with a variety of coupling agents to improve adhesion to resin. For those skilled in the art, a continuous process such as pushtrusion technique for direct incorporation of long glass fibers in high flow polyester compositions will also be possible.

The glass fibers can be blended first with the polyalkylene terephthalate and then fed to an extruder and the extrudate cut into pellets, or, in a preferred embodiment, they can be separately fed to the feed hopper of an extruder. In a highly preferred embodiment, the glass fibers can be fed downstream in the extruder to minimize attrition of the glass. Generally, for preparing pellets of the composition set forth herein, the extruder is maintained at a temperature of approximately 230° C. to 280° C. The pellets so prepared when cutting the extrudate can be one-fourth inch long or less. As stated previously, such pellets contain finely divided uniformly dispersed glass fibers in the composition. The dispersed glass fibers are reduced in length as a result of the shearing action on the chopped glass strands in the extruder barrel.

In some applications it can be desirable to treat the surface of the fiber, in particular a glass fiber, with a chemical coupling agent to improve adhesion to a thermoplastic resin in the composition. Examples of useful coupling agents are alkoxy silanes and alkoxy zirconates. Amino, epoxy, amide, or thio functional alkoxy silanes are especially useful. Fiber coatings with high thermal stability are preferred to prevent decomposition of the coating, which could result in foaming or gas generation during processing at the high melt temperatures required to form the compositions into molded parts.

The reinforcing filler, for example a glass fiber, is present in the composition in an amount from 1 to 60 percent by weight, or 5 to 50 percent by weight, specifically from 10 to 45 percent by weight, more specifically from 20 to 40 percent by weight, and most specifically, from 25 to 35 percent by weight.

In still other embodiments, the compositions can optionally additionally comprise a particulate (non-fibrous) organic filler, which can impart additional beneficial properties to the compositions such as thermal stability, increased density, stiffness, and/or texture. Exemplary particulate fillers are inorganic fillers such as alumina, amorphous silica, aluminosilicates, mica, clay, talc, glass flake, glass microspheres, metal oxides such as titanium dioxide, zinc sulfide, ground quartz, and the like.

In some embodiments, the reinforcing filler, for example glass fibers, is used in combination with flat, plate-like filler, for example talc, mica or flaked glass. Typically, the flat, plate-like filler has a length and width at least ten times greater than its thickness, where the thickness is from 1 to about 1000 microns. Combinations of rigid fibrous fillers with flat, plate-like fillers can reduce warp of the molded article. One specific particulate filler is talc, in particular a talc filler having an average largest dimension of less than 50 micrometers. In addition, or in the alternative, the filler can have a median particle size of less than 50 micrometers. In an embodiment, the equivalent spherical diameter of the particle is used to determine particle size. Use of these types of filler provides molded articles having both low shrinkage and a smooth surface finish. Use of these types of filler can also aid the crystallization of the polyester, and increase heat resistance of the composition. Such talc materials are commercially available from Barretts Minerals Inc. under the trade name ULTRATALC® 609.

In addition to the reinforcing filler, the thermoplastic composition can further comprise a chain extender. Many chain extenders are known and are commercially available. In one embodiment, the thermoplastic composition comprises 1 to 5 percent by weight of a chain extender. In a particular embodiment, the chain extender is an epoxy chain extender such as 3,4-epoxycyclohexylmethyl-3',4'-epoxycyclohexane carboxylate. More particularly, about 1 to 4 percent by weight of 3,4-epoxycyclohexylmethyl-3',4'-epoxycyclohexane carboxylate are present in the thermoplastic composition of the invention. More particularly, about 1.5 to about 3 percent by weight of 3,4-epoxycyclohexylmethyl-3',4'-epoxycyclohexane carboxylate is present in the thermoplastic composition of the invention.

In addition to the reinforcing filler and chain extender, the thermoplastic composition can optionally contain a stabilizer. Many stabilizers are known and are commercially available.

In one embodiment, the thermoplastic composition further comprises 0.01 to 1 percent by weight of a stabilizer. In a particular embodiment, the stabilizer is pentaerythritol-tetrakis(3-(3,5-di-tert.butyl-4-hydroxy-phenyl-)propionate), CAS Reg. No. 6683-19-8, which is available from BASF Corp. More particularly, about 0.02 to 0.08 percent by weight of pentaerythritol-tetrakis(3-(3,5-di-tert.butyl-4-hydroxy-phenyl-)propionate) is present in the thermoplastic composition of the invention. More particularly, about 0.03 to 0.07 percent by weight of pentaerythritol-tetrakis(3-(3,5-di-tert.butyl-4-hydroxy-phenyl-)propionate) is present in the thermoplastic composition of the invention.

In addition to the reinforcing filler, chain extender, and stabilizer, the thermoplastic composition can optionally further comprise an impact modifier. Many impact modifiers are known and are commercially available. In one embodiment, the thermoplastic composition comprises 0.01 to 20 percent by weight of an impact modifier. In a more particular embodiment, the thermoplastic composition comprises 1 to 20 percent by weight of an impact modifier. In a particular embodiment, the impact modifier is linear low density polyethylene (LLDPE). More particularly, about 1 to 10 percent by weight of LLDPE is present in the thermoplastic composition of the invention. More particularly, about 2 to about 8 percent by weight of LLDPE is present in the thermoplastic composition of the invention.

In addition to the reinforcing filler, chain extender, stabilizer, and impact modifier, the thermoplastic composition can optionally comprise other additives. As indicated above, such additives include other impact modifiers, fillers, reinforcing agents, anti-oxidants, heat stabilizers, light stabilizers, ultraviolet light (UV) absorbers, as well as plasticizers, lubricants, mold release agents, antistatic agents, colorants, blowing agents, melt strength additives, flame retardants, and anti-drip agents.

In addition to the above-described additives, used accessorily in a small amount, depending on the object, other polymers or resins, typically in an amount less than 50 weight percent, specifically less than 30 percent by weight, more specifically less that 20 percent by weight, of the total composition, can be added to the thermoplastic resin composition containing the polyethylene terephthalate. For example, such additional polymers can include polyamides, polyphenylene sulfide, polyphenylene oxide, polyacetal, acrylonitrile-styrene resin, acrylonitrile-butadiene-styrene resin, polysulfone, polyesteramides, polyether sulfone, polyether imide, polyether ketone, fluorine resin, and combinations thereof.

In addition to polyalkylene terephthalate, other polyesters can optionally be present in the composition (in an amount of less than 50 weight percent, specifically less than 30 percent by weight, more specifically less that 20 percent by weight, most specifically less than 10 percent by weight of the total composition, provided that such polyesters do not significantly and adversely affect the desired properties of the composition.

For example, a thermoplastic composition can include, in addition to the polyethylene terephthalate prepared by the present process other aromatic polyesters, cycloaliphatic polyesters, and the like. The additional polyesters can be virgin polyesters or wholly or partially bio-derived, including petroleum-derived aromatic polyesters and bio-derived aromatic polyesters.

In one embodiment, the thermoplastic composition, comprises:

from 50 to 99.99 percent by weight of a polyalkylene terephthalate made as described herein, wherein the polyalkylene terephthalate contains 50 to 300 ppm of tetra($C_1$-$C_8$ alkyl) titanate and 100 to 600 ppm of a phosphorous containing compound selected from the group consisting of phosphoric acid, poly(phosphoric acid), phosphorus acid, monobutyl phosphate, dibutyl phosphate, monoalkyl phosphates, dialkyl phosphates, and combinations thereof;

from 0.05 to 5 percent by weight of a chain extender; and from 1 to 60 percent by weight of a reinforcing filler which is glass wherein no quencher for the catalyst complex is added to the compounded thermoplastic composition;

wherein the polyalkylene terephthalate is not produced from recycled PET; and wherein all weight percents are based on the total weight of the composition.

In another embodiment, the thermoplastic composition, comprises:

from 50 to 99.99 percent by weight of a polyalkylene terephthalate made as described herein, wherein the polyalkylene terephthalate contains 50 to 300 ppm of tetra($C_1$-$C_8$ alkyl) titanate and 100 to 600 ppm of a phosphorous containing compound, both based on the total amount of titanium present, wherein the phosphorous containing compound is selected from the phosphorous containing compound is selected from the group consisting of phosphoric acid, poly(phosphoric acid), phosphorus acid, monobutyl phosphate, dibutyl phosphate, monoalkyl phosphates, dialkyl phosphates, and combinations thereof;

from 1 to 60 percent by weight of a reinforcing filler which is glass;

from 0.05 to 5 percent by weight of a chain extender;

from 0 to 30 percent by weight of an impact modifier; and from 0 to 5 percent by weight of an additive selected from a nucleating agent, antioxidant, UV stabilizer, plasticizer, melt strength additive, or a combination thereof, cross-linkers, and combinations thereof; and wherein no quencher for the catalyst complex is added to the compounded thermoplastic composition;

wherein the polyalkylene terephthalate is not produced from recycled PET; and wherein all weight percents are based on the total weight of the composition.

In another embodiment, the thermoplastic composition, comprises:

from 50 to 99.99 percent by weight of a polyalkylene terephthalate as described herein, wherein the polyalkylene terephthalate contains 50 to 300 ppm of tetraisopropyl titanate and 100 to 600 ppm of a phosphorous containing compound selected from the group consisting of phosphoric acid, poly(phosphoric acid), phosphorus acid, monobutyl phosphate, dibutyl phosphate, monoalkyl phosphates, dialkyl phosphates, and combinations thereof;

from 1 to 60 percent by weight of a reinforcing filler which is glass;

from 0.05 to 5 percent by weight of a chain extender;
from 0 to 1 percent by weight of a stabilizer;
from 0.01 to 20 percent by weight of an impact modifier;
wherein no quencher for the catalyst complex is added to the compounded thermoplastic composition;
wherein the polyalkylene terephthalate is not produced from recycled PET; and
wherein all weight percents are based on the total weight of the composition.

In these and other embodiments, wherein no quencher for the catalyst complex is added to the compounded thermoplastic composition.

In another embodiment, the thermoplastic composition comprises:

from 50 to 99.99 percent by weight of a polybutylene terephthalate containing 50 to 300 ppm of tetraisopropyl titanate and 100 to 600 ppm of phosphoric acid;

from 10 to 50 percent by weight of a reinforcing filler which is glass;

from 1.5 to 3 percent by weight of a chain extender;
from 0.01 to 1 percent by weight of a stabilizer; and
from 1 to 10 percent by weight of an impact modifier;
wherein no quencher for the catalyst complex is added to the compounded thermoplastic composition;
wherein the polyalkylene terephthalate is not produced from recycled PET; and
wherein all weight percents are based on the total weight of the composition.

In another embodiment, the thermoplastic composition, comprises:

from 50 to 99.99 percent by weight of a polybutylene terephthalate made as described herein, wherein the polyalkylene terephthalate contains 50 to 300 ppm of tetraisopropyl titanate and 100 to 600 ppm of phosphoric acid;

from 10 to 50 percent by weight of a reinforcing filler which is glass;

from 1.5 to 3 percent by weight of a chain extender;
from 0.01 to 1 percent by weight of a stabilizer; and
from 1 to 10 percent by weight of an impact modifier;
wherein no quencher for the catalyst complex is added to the compounded thermoplastic composition;
wherein the polyalkylene terephthalate is not produced from recycled PET; and
wherein all weight percents are based on the total weight of the composition.

In another embodiment, the thermoplastic composition comprises:

from 50 to 70 percent by weight of a polybutylene terephthalate containing 50 to 300 ppm of tetraisopropyl titanate and 100 to 600 ppm of phosphoric acid;

from 20 to 40 percent by weight of a reinforcing filler which is glass;

from 1.5 to 3 percent by weight of a chain extender;

from 0.01 to 1 percent by weight of a stabilizer; and
from 1 to 10 percent by weight of an impact modifier;
wherein no quencher for the catalyst complex is added to the compounded thermoplastic composition;
wherein the polyalkylene terephthalate is not produced from recycled PET; and
wherein all weight percents are based on the total weight of the composition.

The thermoplastic composition can be prepared by blending the components of the thermoplastic composition employing a number of procedures. In an exemplary process, the thermoplastic composition comprising a polyalkylene terephthalate prepared according to the present process, an optional reinforcing filler, and any optional other polymers or additives are placed into an extrusion compounder to produce molding pellets. The components are dispersed in a matrix in the process. In another procedure, the components and reinforcing filler are mixed by dry blending, and then fluxed on a mill and comminuted, or extruded and chopped. The thermoplastic composition can also be mixed and directly molded, e.g., by injection or transfer molding techniques. Specifically, all of the components are freed from as much water as possible. In addition, compounding is carried out to ensure that the residence time in the machine is short; the temperature is carefully controlled; the friction heat is utilized; and an intimate blend between the components is obtained.

The components of the thermoplastic composition can be pre-compounded, pelletized, and then molded. Pre-compounding can be carried out in conventional equipment. For example, after pre-drying the polyester composition (e.g., for four hours at 120° C.), a single screw extruder can be fed with a dry blend of the ingredients, the screw employed having a long transition section to ensure proper melting. Alternatively, a twin screw extruder with intermeshing co-rotating screws can be fed with resin and additives at the feed port and reinforcing additives (and other additives) can be fed downstream. In either case, a generally suitable melt temperature will be 230° C. to 300° C. The pre-compounded composition can be extruded and cut up into molding compounds such as conventional granules, pellets, and the like by standard techniques. The composition can then be molded in any equipment conventionally used for thermoplastic compositions capable of insert molding.

Thus, in another aspect, the invention is directed to a process for forming a thermoplastic composition by blending, based on the total weight of the thermoplastic composition, the following:

from greater than 50 to 99.9 percent by weight of polyalkylene terephthalate resin composition prepared by as described herein;

from 0.05 to 5 percent by weight of a chain extender
from 0 to 60 percent by weight of filler;
from 0 to 30 percent by weight of an impact modifier;
from 0.01 to 5 percent by weight of at least one additive selected from the group consisting of a nucleating agent, antioxidant, UV stabilizer, plasticizer, epoxy compound, melt strength additive, crosslinker, and combinations thereof, wherein no means for quenching the catalyst contained in the a polyalkylene terephthalate resin composition is added to the compounded thermoplastic composition; and extruding, calendaring, extrusion molding, blow molding, solvent casting, or injection molding the thermoplastic composition.

Advantageously, useful articles can be made from the polyalkylene terephthalate made according to the process described herein or thermoplastic compositions comprising the polyalkylene terephthalate. In a specific embodiment, an article is extruded, calendared, or molded, for example blow molded or injection molded from the polyalkylene terephthalate or composition containing the polymer. The article can be a film or a sheet. When the article is a film, the article can be formed by extrusion molding or calendaring the polyalkylene terephthalate or thermoplastic composition containing the polyester.

The thermoplastic compositions made from the present process provide product lines that have superior hydrolytic stability. In particular, such thermoplastic compositions can provide improved hydro and heat resistance in abusive molding and outdoor application.

As stated above, various combinations of the foregoing embodiments can be used.

The invention is further described in the following illustrative examples in which all parts and percentages are by weight unless otherwise indicated.

EXAMPLES

The following examples illustrate the scope of the invention. The examples and preparations which follow are provided to enable those skilled in the art to more clearly understand and to practice the present invention. They should not be considered as limiting the scope of the invention, but merely as being illustrative and representative thereof. The examples are annotated as "E." and comparative examples are annotated hereinafter as "CE", employed the materials listed in Table 1.

TABLE 1

| Component | Trade Name and Supplier |
|---|---|
| BDO | 1,4-Butanediol, CAS Reg. No. 110-6304, from BASF. |
| PA | Phosphoric Acid CAS Reg. No. 7664-38-2, from Acros. |
| TPT | Tetraisopropyl titanate, CAS Reg. No. 546-68-9, from DuPont, commercial Tyzor grade |
| DMT | Dimethyl Terephthlate, CAS Reg. No. 120-61-6., from Invista |
| Polyester I (PE-I) | Polybutylene Terephthalate (PBT) sold by SABIC Innovative Plastics as VALOX ® 315 with an intrinsic viscosity of 1.2 cm³/g as measured in a 60:40 phenol/tetrachloroethane. |
| Polyester II (PE-II) | Polybutylene Terephthalate (PBT) prepared as described in Process B, below. |
| PBT Glass | ChopVantage ® HP 3770: Chopped 13-micron diameter fiberglass for use with PBT, obtained from PPG Ind. |
| LLDPE | Linear low density polyethylene, from Nova Chemicals, Corp. |
| Hindered Phenol Stabilizer | Pentaerythritol-tetrakis(3-(3,5-di-tert.butyl-4-hydroxy-phenyl-)propionate), CAS Reg. No. 6683-19-8, available from BASF Corp. |
| Sodium Stearate | CAS Reg. No. 822-16-2, obtained as Sodium Stearate T-1 from Chemtura Corp. |
| Cycloaliphatic Epoxy Resin (Chain Extender) | 3,4-Epoxycyclohexylmethyl-3',4'-epoxycyclohexane carboxylate, CAS Reg. No. 2386-87-0, available as Celloxide 2021P from Daicel Chemical Industries. |

Extrusion, Molding, and Testing

For the compositions disclosed herein, ingredients were tumble blended and then extruded on 27 mm twin-screw extruder with a vacuum vented mixing screw, at a barrel and die head temperature between 240 to 265° C. and a 300 rpm screw speed. The extrudate was cooled through a water bath prior to pelletizing. ASTM tensile, Izod and flexural bars were injection molded on a van Dorn molding machine with a set temperature of approximately 240-265° C. The pellets were dried for 3-4 hours at 120° C. in a forced air-circulating oven prior to injection molding.

Notched and un-notched Izod testing was done on 75 mm×12.5 mm×3.2 mm bars using ASTM method D256 at both 23° C. and −30° C. using 5 lbf/ft pendulum energy.

Tensile properties were measured according to ASTM D 638 at 23° C. and 50 mm/min speed for 5 mm/min for the examples.

Flexural properties were tested per ASTM D790 with 3.2 mm thickness specimen and 1.27 mm/min speed.

Specific gravity was measured per ASTM D792.

Vicat softening temperature was tested per ASTM D1525 with 10 N load and 50° C./Hour temperate rate. Vicat temperature was tested on both regular molded examples as well as abusively molded examples. Abusive molding here refers to molding conditions that have 15° C. higher barrel temperature and double dwelling time than regular molding.

Heat deflection temperature (HDT) was tested per ASTM D648 with 1.82 MPa stress on 3.2 mm thickness specimens.

Melt volume-flow rate (MVR) was tested per ASTM D1238 at 250° C. with 5 kg load and 240 s dwell time.

Melt viscosity was determined as a function of time at 265° C. for 30 minutes. This test is also known as "time-sweep". Percent viscosity change was reported.

Differential scanning calorimetry (DSC) analysis was conducted on all examples with a ramp rate of 20° C./min and temperature range of 40 to 300° C.

Tensile and Izod bars were aged in a pressure cooker at 110° C. and 100% relative humidity. Izod and tensile performance of the specimens were measured after 1 day, 2 days, 5 days, and 9 days in the pressure cooker.

Part A. Reference Process for Preparing PBT 1,4-Butanediol (BDO, 10 lbs) and tetraisopropyl titanate (TPT, 9.5 mL) and additional BDO (4 lbs) was added to a Helicone reactor. The resulting mixture was agitated under a positive pressure of nitrogen at atmospheric pressure at 130° C. for 45 minutes. Dimethyl terephthalate (DMT, 25.8 lbs) was then added to the reactor, along with additional BDO (6 lbs), and the temperature is maintained at 130° C. When the addition was complete, the temperature was increased to 225° C. and agitation was continued at 67 percent of maximum.

The reaction mixture was then heated at reflux for 2 hours at approximately 220° C. The temperature of the reaction mixture is then increased to 250° C. The speed of the agitator was set to 60 percent of maximum and the target amps of the motor was set at 3.5 amps.

The polymerization stage was then initiated. The pressure was adjusted to less than 1 torr for 180 minutes. The reaction was allowed to proceed until the polymer mass reached approximately 3 build. The polymer melt was then drained out from the bottom of the reactor into a cooling bath of water at room temperature. The solidified polymer was then ground into pellets. The resulting resin had an intrinsic viscosity of 1.25 dL/min and melting temperature of 225° C.

Part B. Improved Process for Preparing of PBT using 1,4 Butanediol and Dimethyl Terephthalate and an In-Situ Catalyst 10 pounds of 1,4-Butanediol (BDO) and 1.87 g of 1M aqueous phosphoric acid were added to a Helicone reactor. The resulting mixture was agitated under a positive pressure of nitrogen at atmospheric pressure at 130° C. After 20 minutes, 9.5 mL tetraisopropyl titanate (TPT) and additional BDO (4 lbs) were added to the reactor. The resulting mixture was held at 130° C. for 45 minutes. The experimental molar ratio between phosphoric acid and TPT was 0.65. Dimethyl terephthalate (DMT, 25.8 lbs) was then added to the reactor, along with additional BDO (6 lbs), and the temperature was maintained at 130° C. When the addition was complete, the temperature was increased to 225° C. under nitrogen. The agitator speed was then set at 67 percent of maximum.

The reaction mixture was heated at reflux for 2 hours at approximately 220° C. It should be noted that the design of the overhead condenser system did not allow a complete reflux of the BDO. As a result, in the initial stages, about 5 to 10 lbs (2.3 to 4.5 kg) of BDO were collected. The temperature of the reaction mixture was then increased to 250° C. The speed of the agitator was set to 60 percent of maximum and the target amps of the motor was set at 3.5 amps.

The polymerization stage was then initiated. The pressure was adjusted to less than 1 torr for 180 minutes. The reaction was allowed to proceed until the polymer mass reached close to 3 build. The polymer melt was then drained out from the bottom of the reactor into a cooling bath of water at room temperature. The solidified polymer was then ground into pellets. The resulting resin had an intrinsic viscosity of 1.25 dL/min and a melting temperature of 225° C.

Part C. Hydrostability Studies of Compositions Containing PBT Prepared According to Process B The hydrostability of various compositions containing PBT that was made according to Process B was evaluated and compared to containing PBT made according to Process A. The compositions were 30 percent glass-filled impact-modified PBT grades optionally containing cycloaliphatic epoxy resin as a hydrostabilizer. The PBT grades were prepared as described in the Extrusion, Molding and Testing Section. They are summarized in Table 2. CE-1 and CE-2 contained PBT that was prepared according Process A. E-1 and E-2 contained PBT that was prepared according to Process B. As provided in Table 1, E-1 and E-2 showed equivalent mechanical properties with the respect to flexural, impact (both room temperature and low temperature), tensile properties, and HDT compared to CE-1 and CE-2. CE-2 and E-2, in which no epoxy was present, showed higher flow than CE-1 and E-1, where 1.7 percent epoxy was present.

TABLE 2

| Item Description (percents by weight) | CE-1 PE-I + Epoxy Resin | E-1 PE-II + Epoxy Resin | CE-2 PE-I | E-2 PE-II |
|---|---|---|---|---|
| Reference Process Polyester | 63.21 | — | 64.91 | — |
| Improved Process Polyester | — | 63.21 | — | 64.91 |
| Sodium Stearate | 0.05 | 0.05 | 0.05 | 0.05 |
| Hindered Phenol Stabilizer | 0.04 | 0.04 | 0.04 | 0.04 |
| Cycloaliphatic Epoxy Resin | 1.7 | 1.7 | — | — |
| LLDPE | 5 | 5 | 5 | 5 |
| Glass | 30 | 30 | 30 | 30 |
| Total (percent) | 100 | 100 | 100 | 100 |
| Test Description/Unit | | | | |
| Density- | 1.52 | 1.51 | 1.51 | 1.51 |
| Specific Gravity- | 1.52 | 1.52 | 1.52 | 1.51 |
| Flexural Modulus MPa | 8650 | 8470 | 8730 | 8530 |
| Flexural Stress@Yield MPa | 194 | 192 | 190 | 186 |
| Flexural Stress@Break MPa | 193 | 191 | 190 | 185 |
| Notched Impact Ductility, 23° C. % | 0 | 0 | 20 | 0 |
| Notched Impact Strength, 23° C. J/m | 139 | 149 | 129 | 130 |
| Un-Notched Impact Ductility, 23° C. % | 0 | 0 | 0 | 0 |

TABLE 2-continued

| Item Description (percents by weight) | CE-1 PE-I + Epoxy Resin | E-1 PE-II + Epoxy Resin | CE-2 PE-I | E-2 PE-II |
|---|---|---|---|---|
| Un-Notched Impact Strength, 23° C. J/m | 895 | 863 | 875 | 831 |
| Modulus of Elasticity MPa | 10132 | 9104 | 9624 | 9346 |
| Stress at Yield MPa | 116 | 116 | 114 | 113 |
| Stress at Break MPa | 116 | 116 | 114 | 113 |
| Elongation at Yield % | 2.7 | 2.8 | 2.7 | 2.7 |
| Elongation at Break % | 2.9 | 3.2 | 3 | 3 |
| MVR cm$^3$/10 min | 6.6 | 5.1 | 14.6 | 14.4 |
| Deflection temp ° C. | 203 | 201 | 205 | 206 |

The results of hydrostability testing of CE-1, E-1CE-2, and E-2 are summarized in Table 3. Impact strength and tensile strength retention was measured after hydro-aging in a pressure cooker under 110° C. and 100 percent relative humidity. As provided in Table 3, E-1 showed the best hydrostability over time. CE-1 and E-1, both of which contained the epoxy additive, showed better property retention than CE-2 and E-2, both of which did not contain the epoxy additive.

TABLE 3

| | Day Tested | CE-1 + Epoxy Resin | E-1 + Epoxy Resin | CE-2 | E-2 |
|---|---|---|---|---|---|
| Un-notched impact Strength (J/m) | 0 Day | 895 | 863 | 875 | 831 |
| | 2 Day | 370 | 673 | 621 | 540 |
| | 5 Day | 227 | 528 | 252 | 207 |
| | 9 Day | 187 | 306 | 102 | 61.6 |
| Tensile strength (MPa) | 0 Day | 116 | 116 | 114 | 113 |
| | 2 Day | 94 | 106 | 107 | 106 |
| | 5 Day | 79 | 102 | 55 | 40 |
| | 9 Day | 61 | 89 | 28 | 17 |

Figure 1:
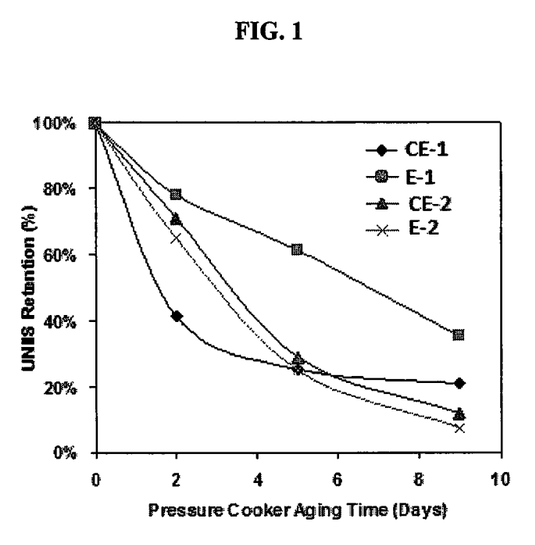
FIG. 1 shows tensile strength retention as a function of hydro-aging time for compositions containing PBT made by the process described herein.
Figure 2:
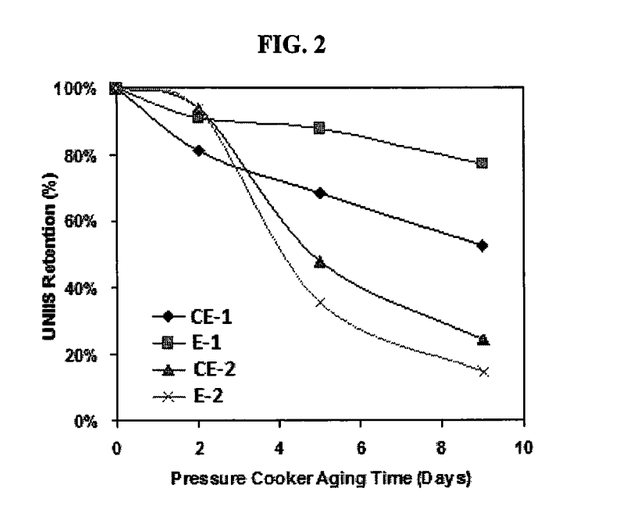
FIG. 2 shows impact strength retention as a function of hydro-aging time for compositions containing PBT made by the process described herein.

Percentage retention in impact strength and tensile strength are shown in FIGS. 1 and 2. It is interesting to note that CE-1 and E-1 are identical compositions except for the way the PBT that was used in the compositions was prepared. It is surprising and unexpected that at Day 9 of accelerated hydro-aging in pressure cooker, as provided by FIG. 1, E-1 showed close to 70 percent more impact retention than CE-1 (21 percent in CE-1 compared to 35 percent in E-1) and as provided by FIG. 2, close to 50 percent more tensile strength retention (53 percent in CE-1 and 77 percent in E-1). In summary, the hydrostability of polyester compositions made with PBT resin according to Process B was improved by close to 50 percent from current compositions made with PBT prepared via Reference Process A.

The foregoing disclosure has been described in some detail by way of illustration and example for purposes of clarity and understanding. The invention has been described with reference to various specific and preferred embodiments and techniques. However, it should be understood that many variations and modifications can be made while remaining within the spirit and scope of the invention. It will be obvious to one of skill in the art that changes and modifications can be practiced within the scope of the appended claims. Therefore, it is to be understood that the above description is intended to be illustrative and not restrictive. The scope of the invention should, therefore, be determined not with reference to the above description, but should instead be determined with reference to the following appended claims, along with the full scope of equivalents to which such claims are entitled.

The invention claimed is:

1. A thermoplastic composition with improved hydrostability, comprising:
    from 50 to 70 percent by weight of polybutylene terephthalate prepared from dimethyl terephthalate and 1,4-butane diol in the presence of phosphoric acid (PA) and 45 to 200 ppm of tetraisopropyl titanate (TPT), wherein the polybutylene terephthalate has an intrinsic viscosity of 1.25 dL/min and a melting temperature of 225° C. and wherein the molar ratio between PA and TPT in the polybutylene terephthalate is 0.5:1 to 1.2:1;
    from 20 to 40 percent by weight of a reinforcing filler which is glass;
    from 1.5 to 3 percent by weight of a chain extender;
    from 0.01 to 1 percent by weight of a stabilizer; and
    from 1 to 10 percent by weight of an impact modifier;
    wherein no quencher for the catalyst complex is added to the thermoplastic composition;
    wherein the polybutylene terephthalate is not produced from recycled polyethylene terephthalate; and
    wherein all weight percents are based on the total weight of the composition;
    and wherein when the thermoplastic composition is heated in a pressure cooker at 110° C. and 100 percent relative humidity for nine days, the composition retains 35 percent of un-notched impact strength according to ASTM D256 and 77 percent tensile strength according to ASTM D638.

2. The thermoplastic composition of claim 1, wherein the reinforcing filler is glass fiber.

3. The thermoplastic composition of claim 2, comprising 25 to 35 percent by weight of the glass fiber.

4. The thermoplastic composition of claim 1, wherein the chain extender is 3,4-epoxycyclohexylmethyl-3',4'-epoxycyclohexane carboxylate.

5. The thermoplastic composition of claim 1, comprising 0.03 to 0.07 percent by weight of the stabilizer, which is pentaerythritol tetrakis(3,5-di-tert-butyl-4-hydroxyhydrocinnamate.

6. The thermoplastic composition of claim 1, comprising 2 to 8 percent by weight of the impact modifier, which is linear low density polyethylene.

7. The thermoplastic composition of claim 1, further comprising:
    from 0 to 5 percent by weight of an additive selected from a nucleating agent, antioxidant, UV stabilizer, plasticizer, melt strength additive, and crosslinkers, and combinations thereof.

8. An article prepared from the thermoplastic composition of claim 1.

9. A thermoplastic composition with improved hydrostability, comprising:
    about 63.21 percent by weight of polybutylene terephthalate prepared from dimethyl terephthalate and 1,4-butane diol in the presence of phosphoric acid (PA) and 45 to 200 ppm of tetraisopropyl titanate (TPT), wherein the polybutylene terephthalate has an intrinsic viscosity of 1.25 dL/min and a melting temperature of 225° C. and wherein the molar ratio between PA and TPT in the polybutylene terephthalate is 0.65:1;
    about 30 percent by weight of glass;
    about 1.7 percent by weight of 3,4-epoxycyclohexylmethyl-3',4'-epoxycyclohexane carboxylate;
    about 0.04 percent by weight of pentaerythritol-tetrakis (3-(3,5-di-tert-butyl-4-hydroxyphenyl)propionate); and
    about 5 percent by weight of linear low density polyethylene;
    wherein no quencher for the catalyst complex is added to the thermoplastic composition;
    and
    wherein all weight percents are based on the total weight of the composition;
    and wherein when the thermoplastic composition is heated in a pressure cooker at 110° C. and 100 percent relative humidity for nine days, the composition retains 35 percent of un-notched impact strength according to ASTM D256 and 77 percent tensile strength according to ASTM D638.

* * * * *